(12) United States Patent
Birch

(10) Patent No.: US 8,079,301 B2
(45) Date of Patent: Dec. 20, 2011

(54) TEA POT HAVING A TEA FILTER

(76) Inventor: David R. Birch, Wimbledon (GB)

( * ) Notice: Subject to any disclaimer, the term of this patent is extended or adjusted under 35 U.S.C. 154(b) by 454 days.

(21) Appl. No.: 12/363,008

(22) Filed: Jan. 30, 2009

(65) Prior Publication Data

US 2009/0193979 A1 Aug. 6, 2009

(51) Int. Cl.
*A47G 19/14* (2006.01)
*A47J 31/20* (2006.01)

(52) U.S. Cl. ............................................. 99/317; 99/319
(58) Field of Classification Search .................. 99/279, 99/299–300, 306, 316–323; 220/230, 495.03; 210/474
See application file for complete search history.

(56) References Cited

U.S. PATENT DOCUMENTS

| | | | | |
|---|---|---|---|---|
| 807,547 | A * | 12/1905 | Fliegel | 210/489 |
| 918,674 | A * | 4/1909 | Hathaway | 99/317 |
| 1,038,558 | A * | 9/1912 | Gardner | 99/319 |
| 2,349,691 | A * | 5/1944 | Amstutz | 248/94 |
| 4,832,845 | A * | 5/1989 | Hendretti | 210/470 |
| 5,125,327 | A * | 6/1992 | Winnington-Ingram | 99/306 |
| 5,363,745 | A | 11/1994 | Lin | |
| 5,453,189 | A * | 9/1995 | Joergensen | 210/238 |
| 5,924,354 | A * | 7/1999 | Court et al. | 99/318 |
| 6,494,129 | B2 * | 12/2002 | Lin | 99/320 |
| 7,484,457 | B2 * | 2/2009 | Henderson | 99/495 |

FOREIGN PATENT DOCUMENTS

| | | |
|---|---|---|
| GB | 207093 A | 2/1923 |
| GB | 239318 A | 7/1924 |
| GB | 300540 A | 4/1928 |
| GB | 601249 | 5/1946 |
| WO | WO2007/082391 A1 | 7/2007 |

OTHER PUBLICATIONS

International Search Report re application No. GB0801905.1.

* cited by examiner

*Primary Examiner* — Kien Nguyen
(74) *Attorney, Agent, or Firm* — Howard M. Gitten; Edwards Wildman Palmer LLP

(57) ABSTRACT

A tea pot comprises a receptacle having a pouring device and a handle on an opposite side. A water filling aperture at the receptacle top defines a recessed circumferential lip. A lid closes said aperture. A perforated cylindrical filter has a cross sectional shape substantially matching the aperture. The filter is insertable into the pot through the aperture. A circumferential flange is located at the upper part of the filter and adapted to sit on the lip when the filter is inserted into the receptacle. An engagement means permits the filter to be removably retained in the receptacle and comprises a sprung detent located at the upper part of the container which is urged away from the container for engageing the lip; retaining the filter in the pot. The detent has a recess to engage both above and below the lip.

7 Claims, 4 Drawing Sheets

TEA POT HAVING A TEA FILTER

CROSS-REFERENCE TO RELATED APPLICATION

This application claims priority to UK Patent Application No. 0801905 filed Feb. 1, 2008 in its entirety.

BACKGROUND OF THE INVENTION

This invention relates to a tea pot having a tea filter. The problem with brewing fresh tea with tea leaves as opposed to the current fashion either of having instant tea or using tea bags is to ensure that the tea is in adequate contact with the brewing water while preventing the tea leaves from leaving the brewing vessel, normally a tea pot, while the tea is being poured out. One means of achieving this is to provide a tea filter separate from the tea pot and through which the tea is poured so that any tea leaves poured out of the tea pot will be collected in the tea filter and not in the recipients' cup.

The present invention seeks to obviate or substantially reduce the above problem by providing a tea filter for location in a tea pot.

BRIEF SUMMARY OF THE INVENTION

According to the invention, a tea pot comprises a receptacle having a pouring device at a first side, a handle on a second side opposite to said first side with said pouring device, a water filling aperture at the top of said receptacle defining a recessed circumferential lip, a lid for closing said water filling aperture and a tea filter comprising a perforated cylindrical container of a cross sectional shape substantially the same as that of said water filling aperture, said filter being adapted to be insertable into said teapot through said water filling aperture thereof, a circumferential flange at the upper part of said tea filter which is adapted to sit on said circumferential lip when said tea filter is inserted into said receptacle of said tea pot and an engagement means adapted to permit said tea filter to be removably retained in said teapot receptacle, said engagement means comprising a sprung detent located at the upper part of said container, said detent being urged away from said container for engagement under said lip of said water filling aperture to retain said tea filter in said tea pot and defining a recess therein whereby it engages both above and below said lip.

The tea filter container may be a close fit in the water filling aperture.

The detent may also cooperate with a recess defined in said lid of said teapot to releasably secure said lid to said tea pot.

The detent may comprise an operating lever which extends out of said water filling aperture of said tea pot.

DETAILED DESCRIPTION OF THE INVENTION

Figure 1:
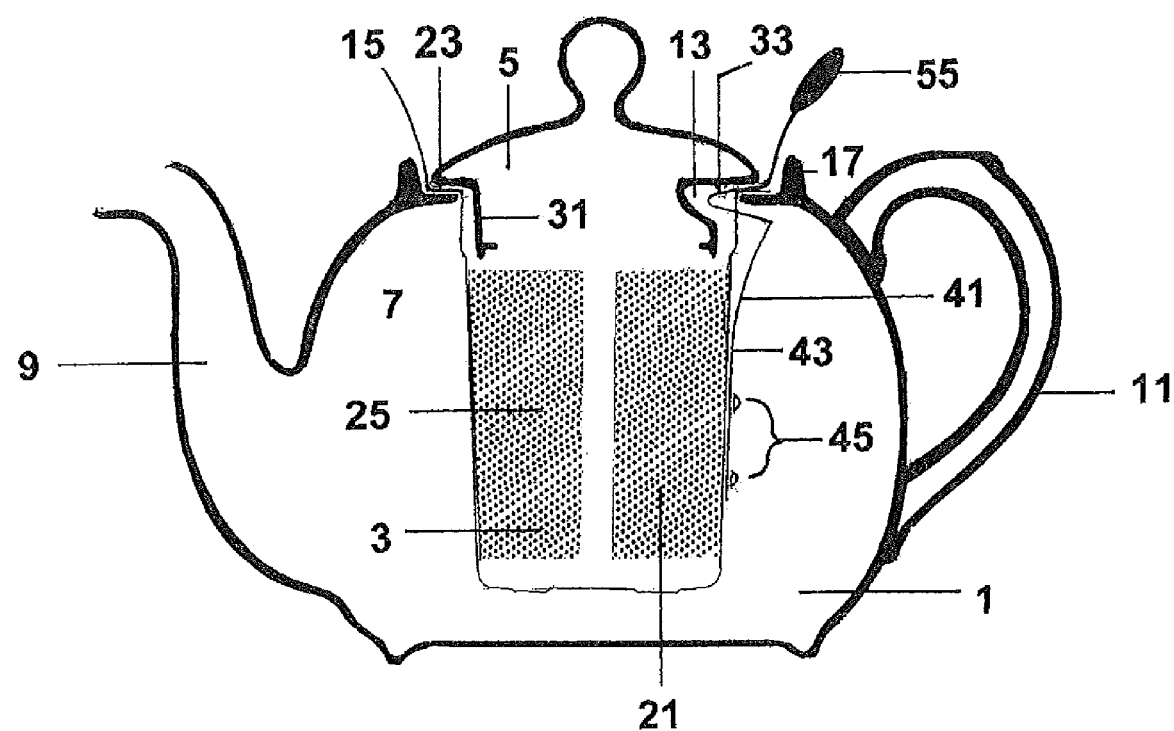
FIG. 1 is a vertical section through a teapot and tea filter in accordance with the invention.
Figure 2:
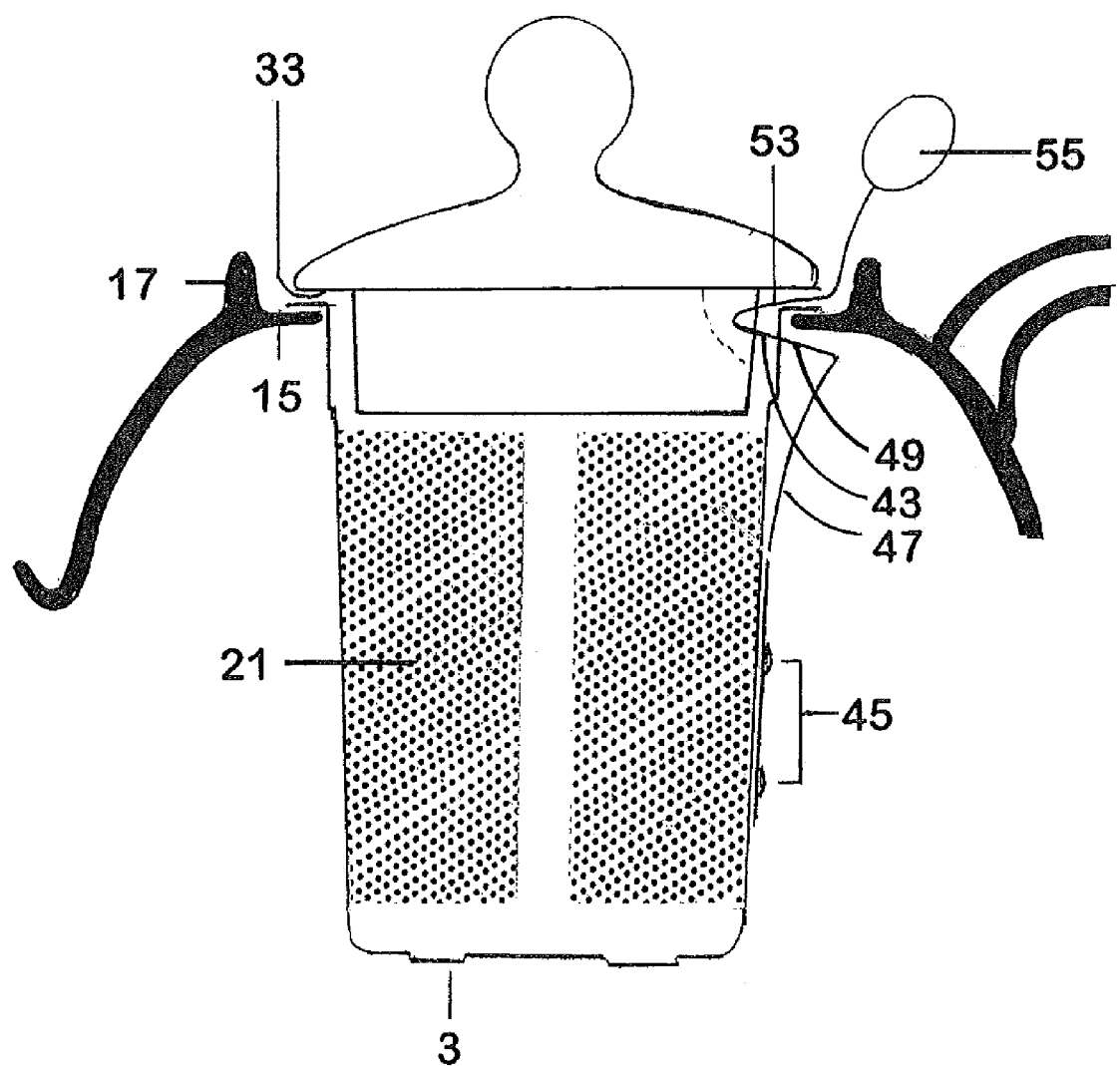
FIG. 2 is an enlarged sectional view of the tea filter and the upper part of the teapot and lid as shown in FIG. 1.

Referring to the drawings, there is shown a teapot 1 with a tea filter 3 and a teapot lid 5. The teapot itself is generally of conventional design and, to this end comprises a receptacle 7 having a pouring spout 9 to one side and a handle 11 on the opposite side. At the top of the tea pot 1 is a water filling aperture 13 having an inwardly extending annular lip 15 surrounded by a rib 17 so that the lip 15 is recessed in relation to the rib 18 so that it provides a seat for a purpose to be described.

Within the teapot 1 is located the tea filter 3. This is a cylindrical container 21 of an outer dimension similar to the diameter of the water filling aperture 13 as defined by the annular lip 15. The upper end of the container 21 is provided with a flange 23 which is arranged to sit on the lip 15 of the water filling aperture so as to prevent the tea filter 3 from passing completely into the receptacle 7 of the tea pot 1. The filter 3 is formed with a number of perforated areas or panels 25. The tea filter suitably contains tea leaves onto which, when the filter is in the teapot can have boiling water poured over them to make tea.

The lid 5 of the teapot 1 is shaped so as to have a portion 31 which extends into the receptacle 7 through the water filling aperture 13 and thus also into the top of the container 21 of the tea filter 3. The lid 5 has a shoulder 33 which sits on the lip 15 on top of the flange 23 of the container 21.

Figure 3:
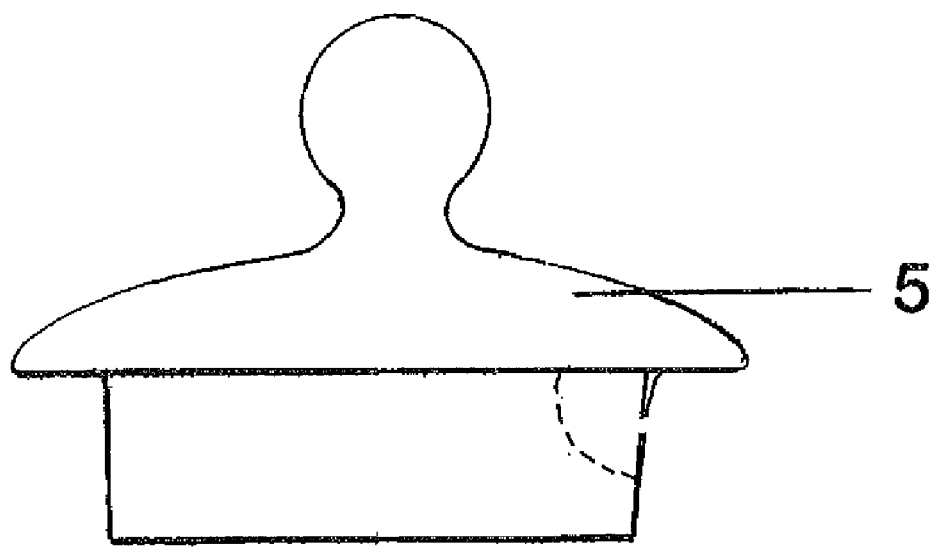
FIG. 3 is a side and front view of the teapot lid.
Figure 4:
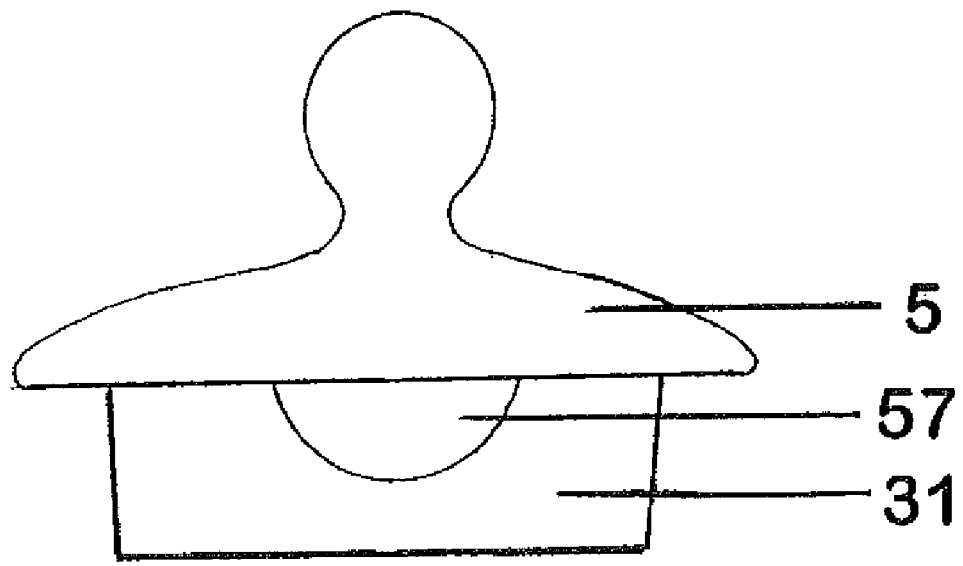
FIG. 4 is a side and front view of the teapot lid.

The filter 3 is provided with engagement means 41 which secures the tea filter 3 removably in the tea pot 1. This engagement means 41 is a spring strip forming a spring locking toggle or detent 43 which is attached to the side of the container 21 by means of a pair of rivets 45. The spring strip 41 extends upwardly and curves away from the container 21 in a portion 47. At the upper end of the portion 47, the spring strip is bent inwards at a portion 49 and passes through an open ended aperture 51 in the container 21. Thereafter, the spring strip 41 is bent outwardly in a portion 53 back out of the aperture 51. From there, it is bent upwards to form an operating handle 55. In order to enable the engagement means to fit in with the lid 5, the lids is provided with a recess 57 which can best be seen in FIGS. 3 and 4.

The operation of the teapot and tea filter will now be described with particular reference to FIG. 5.

Figure 5:
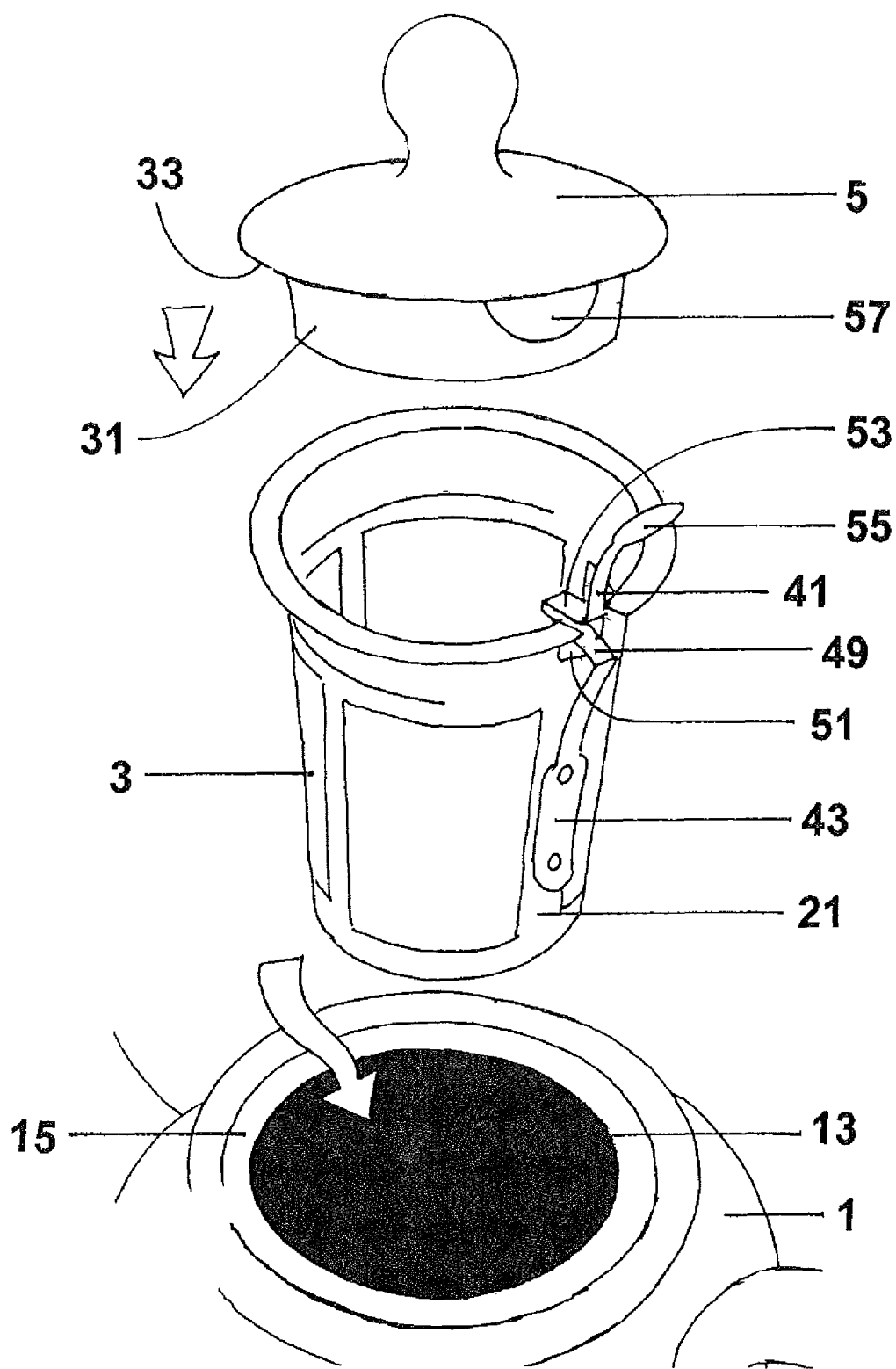
FIG. 5 is an exploded view in perspective of the lid, the filter and the upper part of the tea pot.

Starting with the parts disassembled as shown in FIG. 5, the filter 3 is pushed into the teapot 1 through the water filling aperture 13 of the tea pot 1 until the flange 23 is in engagement with the lip 15. In doing this, the spring strip 43 will be pushed inwards towards the container 21 to allow it to pass through the water filling aperture 13 until, as the portion 49 of the sprig strip 43 passes beneath the lip 15 of the tea pot 1, the spring strip 43 will spring backwards and locate the lip 15 between the portions 49 and 53 of the spring strip, thus locking the filter 3 in position. The lid 5 can be placed on the tea pot 1 with the recess 57 receiving the connected ends of the portions 49 and 53 of the spring strip 43 which will click into the recess 55 and thus secure the lid 5 to the tea pot 1.

In order to remove the filter again, the handle 55 of the spring strip 43 is moved outwards to release the lid 5 which can then be lifted off. The handle 55 of the spring strip 43 is then moved inwards, in the opposite direction to release the lip 15 and allow the filter 3 to be lifted out.

It will be appreciated that various modifications of or additions to can be made to the described embodiment without departing from the scope of the invention. For example, the shape of the tea pot receptacle 7 and the spout and handle can be varied as desired. The water filling aperture 13 can be of other shapes than circular such as oval or polygonal. The shape of the filter 3 will also depend on the shape of the water filling aperture 13. The filter 3 could be made of different materials such as plastics materials or a combination of different materials. For example, the main container could be made o metal while the perforations could be suitably structured plastics panels set in apertures in the metal container 3.

What is claimed as new and desired to be protected by Letters Patent of the United States is:

1. A tea pot comprising a receptacle having a pouring device at a first side, a handle on a second side opposite to said first side with said pouring device, a water filling aperture at the top of said receptacle defining a recessed circumferential lip, a lid for closing said water filling aperture and a tea filter comprising a perforated cylindrical container of a cross sectional shape substantially the same as that of said water filling aperture, said filter being adapted to be insertable into said teapot through said water filling aperture thereof, a circumferential flange at the upper part of said tea filter which is adapted to sit on said circumferential lip when said tea filter is inserted into said receptacle of said tea pot and an engagement means for permitting said tea filter to be removably retained in said teapot receptacle, said engagement means comprising a sprung detent located at the upper part of said container, said detent being urged away from said container for engagement under said lip of said water filling aperture to retain said tea filter in said tea pot and defining a recess therein whereby it engages both above and below said lip.

2. A tea pot as claimed in claim 1, wherein said tea filter container is a close fit in the water filling aperture.

3. A tea pot as defined in claim 2, wherein said detent also cooperates with a recess defined in said lid of said teapot to releasably secure said lid to said tea pot.

4. A tea pot as defined in claim 3, wherein said detent comprises an operating lever which extends out of said water filling aperture of said tea pot.

5. A tea pot as defined in claim 1, wherein said detent also cooperates with a recess defined in said lid of said teapot to releasably secure said lid to said tea pot.

6. A tea pot as defined in claim 5, wherein said detent comprises an operating lever which extends out of said water filling aperture of said tea pot.

7. A tea pot as defined in claim 1, wherein said detent comprises an operating lever which extends out of said water filling aperture of said tea pot.

* * * * *